US009596124B2

(12) United States Patent
Sasaki et al.

(10) Patent No.: US 9,596,124 B2
(45) Date of Patent: *Mar. 14, 2017

(54) ASSISTANCE DEVICE OF NETWORK SYSTEM

(75) Inventors: Hiromi Sasaki, Kyoto (JP); Hiroshi Yoshida, Shiga (JP); Takeshi Jinkawa, Shiga (JP); Masaki Namie, Osaka (JP); Hirohito Mizumoto, Shiga (JP); Yutaka Tahara, Shiga (JP); Shigenori Sawada, Osaka (JP)

(73) Assignee: OMRON CORPORATION, Kyoto (JP)

( * ) Notice: Subject to any disclaimer, the term of this patent is extended or adjusted under 35 U.S.C. 154(b) by 424 days.

This patent is subject to a terminal disclaimer.

(21) Appl. No.: 14/005,324

(22) PCT Filed: Mar. 23, 2011

(86) PCT No.: PCT/JP2011/057035
§ 371 (c)(1),
(2), (4) Date: Nov. 26, 2013

(87) PCT Pub. No.: WO2012/124163
PCT Pub. Date: Sep. 20, 2012

(65) Prior Publication Data
US 2014/0082116 A1    Mar. 20, 2014

(30) Foreign Application Priority Data
Mar. 15, 2011    (JP) ................................ 2011-056379

(51) Int. Cl.
G06F 15/16    (2006.01)
H04L 12/24    (2006.01)
(Continued)

(52) U.S. Cl.
CPC ........ *H04L 41/04* (2013.01); *H04L 12/40006* (2013.01); *H04L 41/0866* (2013.01);
(Continued)

(58) Field of Classification Search
CPC ..... H04W 24/06; H04W 24/08; H04W 84/20; H04W 8/005; H04W 92/02;
(Continued)

(56) References Cited

U.S. PATENT DOCUMENTS 5,854,906 A * 12/1998 Van Loo ............. G06F 13/4022
710/110
2003/0189929 A1    10/2003 Matsuzaki et al.
(Continued)

FOREIGN PATENT DOCUMENTS

JP    2002-84295    3/2002
JP    2005-45840    2/2005
(Continued)

OTHER PUBLICATIONS

International Search report for PCT/JP2011/057035, mail date is Jun. 21, 2011.
(Continued)

*Primary Examiner* — Hitesh Patel
(74) *Attorney, Agent, or Firm* — Greenblum & Bernstein, P.L.C.

(57) ABSTRACT

A design assistance device includes: a design information storage section configured to store design information containing at least information of slave devices and information of a topology in a network system in accordance with a design created by a user; an actual configuration information generation section configured to generate actual configuration information containing at least the information of the slave devices and the information of the topology in the actual network system; a comparison section configured to compare the design information and the actual configuration information; and an output section configured to generate a
(Continued)

comparison screen indicating the respective configurations of the designed network system and the actual network system along with their commonalities and differences and outputting the comparison screen to a display device. Thus, a technology can be provided which assists the user to easily compare the designed network configuration and the actual machine's network configuration.

8 Claims, 9 Drawing Sheets

(51) Int. Cl.
  *H04L 12/40* (2006.01)
  *H04L 12/403* (2006.01)
  *H04L 29/12* (2006.01)
(52) U.S. Cl.
  CPC ............ *H04L 41/12* (2013.01); *H04L 41/145* (2013.01); *H04L 12/403* (2013.01); *H04L 41/0853* (2013.01); *H04L 61/2038* (2013.01)
(58) Field of Classification Search
  CPC ............ G06F 17/5004; G06F 17/5081; G06F 19/3406; G06F 3/0629; H04L 41/12; H04L 41/0803; H04L 41/08; H04L 12/40006; H04L 41/04; H04L 41/0866; H04L 41/145; G06N 3/02; G06N 3/04
  See application file for complete search history.

(56) References Cited

U.S. PATENT DOCUMENTS

| | | | |
|---|---|---|---|
| 2006/0155758 A1* | 7/2006 | Arnegaard | G01V 1/22 |
| 2009/0059814 A1* | 3/2009 | Nixon | H04L 41/12 370/254 |
| 2010/0114618 A1* | 5/2010 | Wilcock | G06Q 10/06 705/7.37 |
| 2010/0283505 A1* | 11/2010 | Koch | G06F 15/7867 326/41 |
| 2011/0004564 A1* | 1/2011 | Rolia | G06Q 10/06 705/348 |

FOREIGN PATENT DOCUMENTS

| | | |
|---|---|---|
| JP | 2007-317206 | 12/2007 |
| JP | 2010-272034 | 12/2010 |
| WO | 2011/037004 | 3/2011 |

OTHER PUBLICATIONS

U.S. Appl. No. 14/005,305 to Hiromi Sasaki et al., filed Sep. 16, 2013.

U.S. Appl. No. 14/005,356 to Hiromi Sasaki et al., filed Sep. 16, 2013.

* cited by examiner

FIG. 3 (A)

Design information

| Profile information | Slave connection information | Address information |
|---|---|---|
| Product: a1<br>Vendor ID: A<br>Revision No.: 002 | Device: MASTER<br>Port: OUT | Node address information: 1 |
| Product: a3<br>Vendor ID: A<br>Revision No.: 000 | Device: a1-A-002<br>Port: Inside | Node address information: 2 |
| Product: b1<br>Vendor ID: B<br>Revision No.: 000 | Device: a3-A-000<br>Port: X2 | Node address information: 10 |
| Product: c5<br>Vendor ID: C<br>Revision No.: 051 | Device: a3-A-000<br>Port: OUT | Node address information: 7 |
| Product: c5<br>Vendor ID: C<br>Revision No.: 052 | Device: c5-C-051<br>Port: OUT | Node address information: 4 |
| Product: b9<br>Vendor ID: B<br>Revision No.: 033 | Device: a1-A-002<br>Port: OUT | Node address information: 6 |

FIG. 3 (B)

Actual configuration information

| Profile information | Slave connection information | Address information |
|---|---|---|
| Product: a1<br>Vendor ID: A<br>Revision No.: 002 | Device: MASTER<br>Port: OUT | Alias: 1 |
| Product: a3<br>Vendor ID: A<br>Revision No.: 000 | Device: a1-A-002<br>Port: Inside | Alias: 2 |
| Product: c5<br>Vendor ID: C<br>Revision No.: 051 | Device: a3-A-000<br>Port: OUT | Alias: 3 |
| Product: c5<br>Vendor ID: C<br>Revision No.: 052 | Device: c5-C-051<br>Port: OUT | Alias: 4 |
| Product: b0<br>Vendor ID: B<br>Revision No.: 000 | Device: a1-A-002<br>Port: OUT | Alias: 5 |
| Product: b9<br>Vendor ID: B<br>Revision No.: 033 | Device: b0-B-000<br>Port: OUT | Alias: 6 |

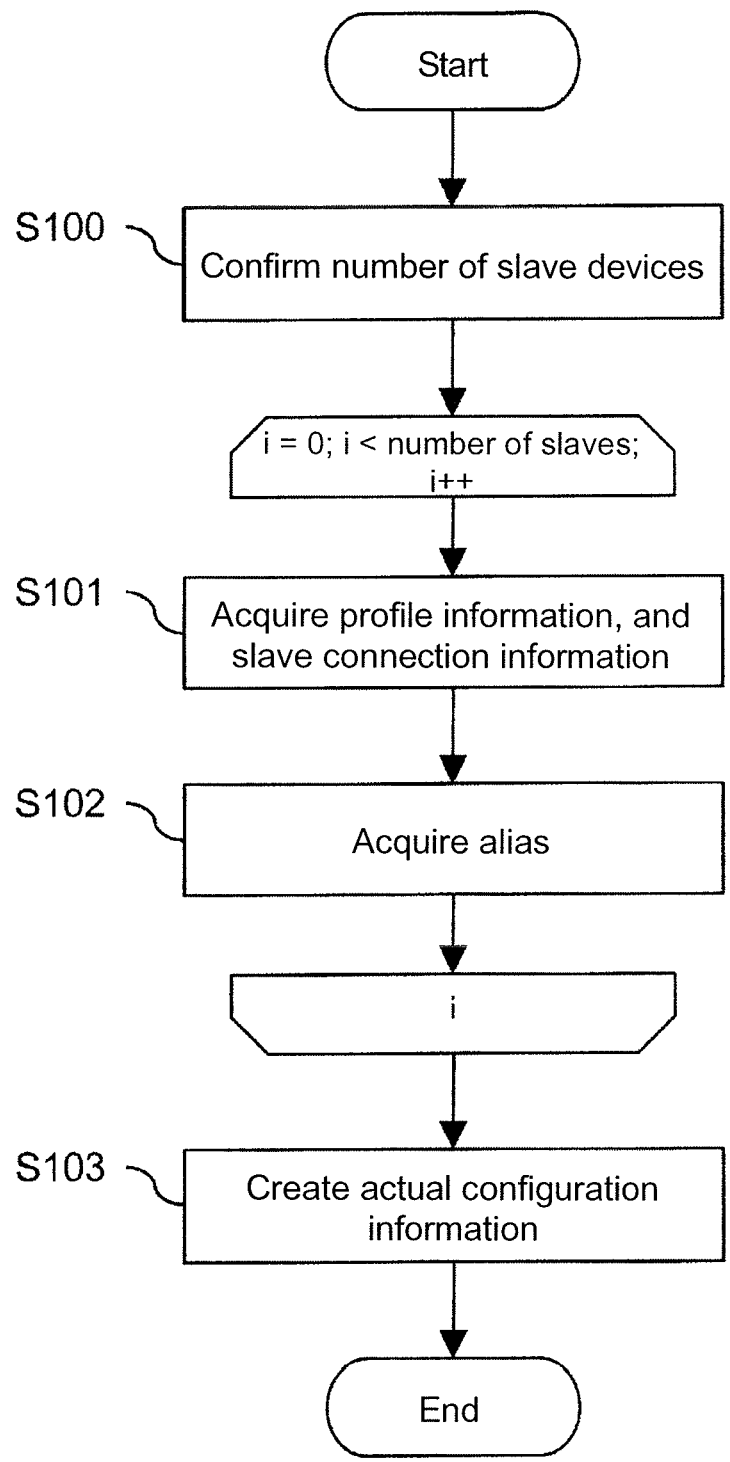

Fig. 6

Network configuration in accordance with design (10)

| Address | |
|---|---|
| 1 | MASTER (11), a1-A-002 (12a) |
| 2 | a3-A-000 (12b), X1, X2 |
| 10 | b0-B-000 (12c) |
| 7 | c5-C-051 (12d) |
| 4 | c5-C-052 (12e) |
| 6 | b9-B-033 (12f) |

(13)

Network configuration of actual machine (20)

| Address | |
|---|---|
| 1 | MASTER (21), a1-A-002 (22a) |
| 2 | a3-A-000 (22b), X1, X2 |
| 3 | c5-C-051 (22c) |
| 4 | c5-C-052 (22d) |
| 5 | b0-B-000 (22e) |
| 6 | b9-B-033 (22f) |

Comparison results (30)

| Configuration in accordance with design | Comparison results | Configuration of actual machine |
|---|---|---|
| MASTER | Agreed | MASTER |
| 1: a1-A-002 | Agreed | 1: a1-A-002 |
| 2: a3-A-000 | Agreed | 2: a3-A-000 |
| --- | Added | 3: c5-C-051 |
| 10: b0-B-000 | Deleted | --- |
| 7: c5-C-051 | Deleted | --- |
| 4: c5-C-052 | Agreed | 4: c5-C-052 |
| --- | Added | 5: b0-B-000 |
| 6: b9-B-033 | Deleted | 6: b9-B-033 |

[Reflection] (40) [Total reflection] (41)

ASSISTANCE DEVICE OF NETWORK SYSTEM

TECHNICAL FIELD

The invention relates to a design assistance device of a network system having a master device and a slave device.

BACKGROUND ART

In factory automation (FA), production facilities placed in a factory are controlled by an industrial network system that includes various types of slave devices which collects data of and conducts control on the production facilities and a master device which conducts central control on these slave devices.

Technologies have been developed for an industrial Ethernet (registered trademark) to which the Ethernet technologies are applied, as one example of the industrial network system for use in the FA field. The industrial Ethernet, referred to also as a manufacturing industrial Ethernet, is a network that has introduced Ethernet technologies and apparatuses to the FA field in various layers. Various associations have openly disclosed the standards of the industrial Ethernet, one of which is Ethernet for Control Automation Technology (EtherCAT: registered trademark) promoted by the EtherCAT Technology Group (ETG).

When building this type of an industrial network system, first a design assistance device editor provided as personal computer software or a dedicated system is utilized to design a network configuration (namely, specification of a model, connection order, and addresses and various parameters assigned to the slave devices). Then, after the network configuration is fixed, based on its design information, various programs configured to operate in the master device are designed and developed and an actual network system (actual machine) is assembled.

In this case, the actual machine should preferably be assembled as designed. Actually, however, in a process where the actual machine is assembled, there are many cases where the configuration is changed due to addition of slave devices, shift in their connection order, and alteration of their addresses in order to solve problems and correct functions. Such changes in network configuration have an influence on developments of a master device program and, therefore, are desired to be reflected in the original design information as quickly as possible. Moreover, to minimize corrections in the program under development, changes and modifications of the design information should be reduced to a minimum. Conventionally, identification of portions to be changed and modification of the design information have all been performed manually and required a lot of manpower.

As technologies to present a network configuration to the user in a manner such that he can easily understand the network configuration, for example, those disclosed in Patent Documents 1 and 2 are known. Patent Document 1 proposes a mechanism that, if a new model of a PLC or slave device appears, a design assistance device reads an information file of the model such that models supported by an editor can be increased. Further, Patent Document 2 proposes not a technology about industrial networks but a method for providing GUI display of information of troubles occurring on the network along with the network configuration information.

PRIOR ART DOCUMENT

Patent Documents

Patent Document 1: JP 2010-272034 A, filed on Dec. 2, 2010
Patent Document 2: JP 2005-45840 A, filed on Feb. 17, 2005

SUMMARY OF THE INVENTION

Problems to be Solved by the Invention

In view of the above, the invention has been developed, and it is an object of the invention to provide a technology that assists the user in a manner such that he can easily compare a network configuration in accordance with a design and a network configuration of an actual machine to each other in a network system including a master device and a plurality of slave devices.

Means for Solving the Problem

The first aspect of the invention is a design assistance device of a network system including a master device and a plurality of slave devices, the design assistance device including: a design information storage section configured to store design information containing at least information of the slave devices and information of a topology in a network system in accordance with a design created by a user; an actual configuration information generation section configured to, based on information collected by the master device from the slave devices in an actual network system, generate actual configuration information containing at least the information of the slave devices and the information of the topology in the actual network system; a comparison section configured to compare the design information and the actual configuration information; and an output section configured to, based on results of comparison by the comparison section, generate a comparison screen indicating the respective configurations of the designed network system and the actual network system along with their commonalities and differences and outputting the comparison screen to a display device.

By the configuration, the design network configuration and the actual network configuration are compared to each other automatically, to present the results to the user as a comparison screen. On the comparison screen, the commonalities and differences of the designed network configuration and the actual network configuration are indicated. Therefore, the user can quickly and easily grasp alteration positions of the network configuration, and easily decide how the design information should be modified in accordance with an actual machine.

Effect of the Invention

By the invention, it is possible to assist the user in a manner such that he can easily compare a network configuration in accordance with a design and a network configuration of an actual machine to each other in a network system including a master device and a plurality of slave devices.

BRIEF DESCRIPTION OF THE DRAWINGS

FIG. 3(A) is a table showing one example of design information and FIG. 3(B) is a table showing one example of actual configuration information;

FIG. 4 is a flowchart showing a flow of slave information collection processing;

FIG. 6 is a table showing one example of a comparison screen;

MODE FOR CARRYING OUT THE INVENTION

The following will describe a preferred embodiment of the invention with reference to the drawings. Although in the embodiment described below, a design assistance device (design assistance tool) in a network system compatible with the EtherCAT standard will be taken up, the application of the invention is not limited to it. The invention can be applied to any network system including a master device and a plurality of slave devices.

(Configuration of Network System)

Figure 2:
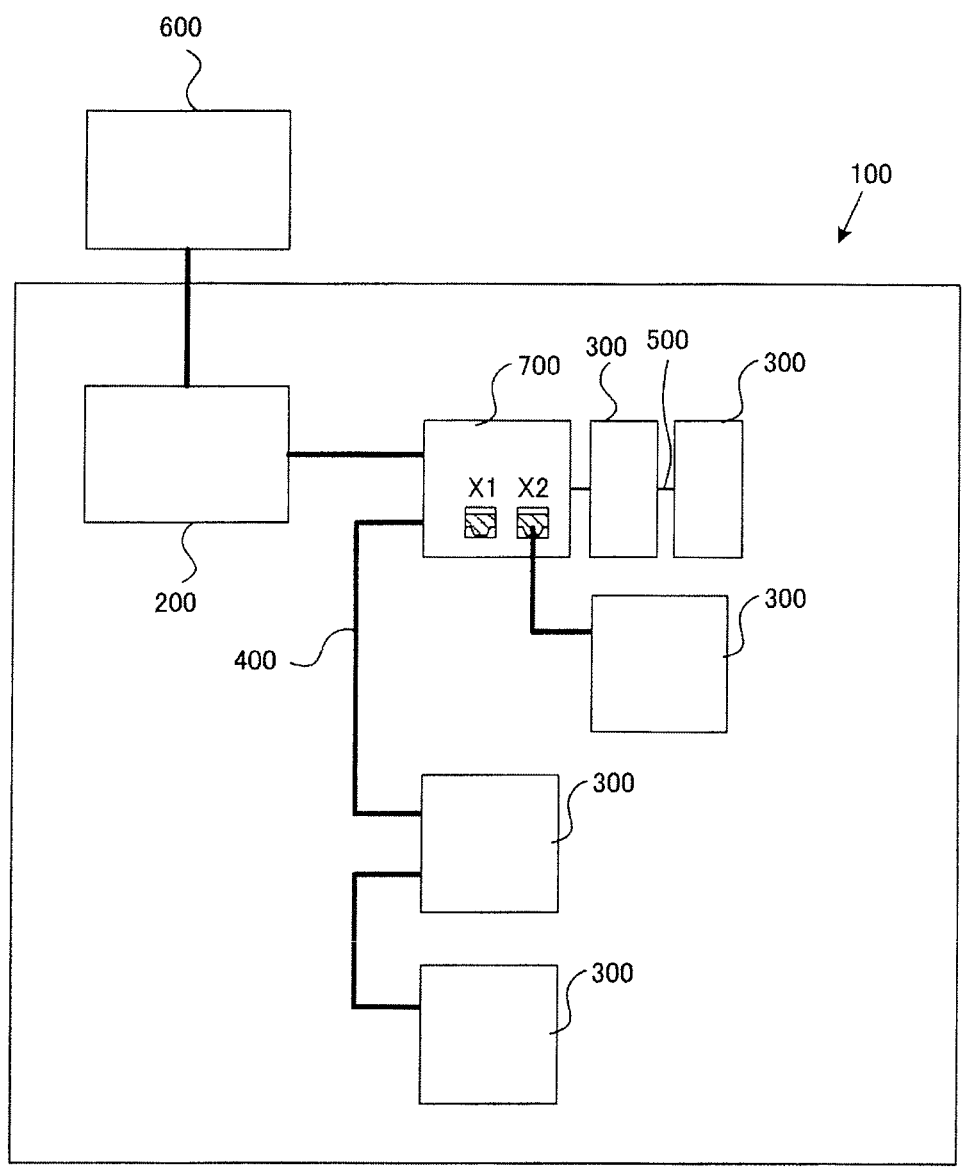
FIG. 2 is an explanatory block diagram of a configuration example of an industrial network system.

First, a configuration example of an industrial network system will be described with reference to FIG. 2. In the figure, an industrial network 100 is formed by connecting a master device 200 (programmable logic controller: PLC) and a plurality of slave devices 300 to each other directly or indirectly via a cable 400, a device-fitted I/O unit (internal bus) 500, or hub device 700. The slave devices 300 may be a power supply unit, a motor unit, a counter unit, an image unit, a communication unit, an I/O unit, etc. To the master device 200, a management device 600 may be connected which is used by a user to set operations of the master device 200, display operation states of the industrial network system 100, and design a network system. The management device 600 includes a personal computer etc. in which a design assistance tool or a management tool is installed.

Assuming that the side of the master device is the upstream side, the hub device 700 has an IN port connecting to the upstream side and an OUT port connecting to the downstream side as well as a plurality of branching ports X1, X2. The user can make a desired topology by interconnecting the devices as setting their order and branching by using the cable or the hub device. A branching structure can be made also by connecting not only the hub device but also the plurality of slave devices on the downstream side of the slave device. The hub device is also one type of the slave device, so that they are generally referred to as a slave device unless they need to be distinguished from each other in particular.

In an EtherCAT, a general Ethernet-standard cable can also be used as the cable 400 or the cable 400 can be manufactured using facilities for use in manufacturing of Ethernet-use apparatuses. Thus, the costs can be reduced.

Such an industrial network system 100 is utilized as an FA system placed in, for example, a factory. The master device 200 transmits an information signal containing control data through the network, in accordance with a program or operations. In response to a request from the master device contained in the information signal, to the slave devices 300 performs device operations based on the received information signal and rewrites and returns the received information signal. Production in the factory accommodating the industrial network system 100 is achieved by the slave devices all sharing tasks in conjunction with each other when the master device controls contents and timing of their operations.

(Master-to-Slave Communication)

The industrial network system 100 of the present embodiment may include three modes prepared as modes for communication between the master device 200 and the slave devices 300, namely a position address mode, a logical address mode, and a node address mode. In the position address mode, communication is performed by using position addresses which are determined by physical connection order as viewed from the master device, the position address mode being utilized in, for example, low-level communication processing such as collection of information of the slave devices all over the network. In the logical address mode, cyclic communication is performed by using data referred to as frames, the logical address mode being utilized in communication processing related to performing of tasks which require high-speed data transmission and real-time properties.

In the node address mode, master-to-slave communication is performed by using node addresses assigned by the master device 200 to the slave devices 300. The slave devices 300 each have an address value preset by the user beforehand, the address value being held in an involatile memory in each of the slave devices. The master device 200 reads the address values from the slave devices 300 upon actuation of the network and, in principle, assigns node addresses having the same values as those address values to the slave devices 300, respectively. To clearly distinguish the address value as a set value preset to the slave device from the address value of the node address assigned to the slave device and utilized in communication, the address as the set value will be hereinafter referred to as an "alias".

Thus, the node address are statically assigned, so that communication can be performed independently of the state of the network, that is, the node addresses are not changed even if the network state changes. Therefore, this mode is utilized in a case of, such as, for example, communication processing related to monitoring or management of the slave devices, when event-type message communication in which a communication-partner slave device (node) has been identified is necessary.

(Configuration of Design Assistance Device)

To design the industrial network system 100, it is necessary to take into consideration a topology such as order in which the slave devices are connected and port numbers on the hub device. However, in contrast to the SEs or customer engineers, the common users do not always have expert knowledge or experiences. Accordingly, as one function of the management device 600, a design assistance tool is provided which assists designing a network configuration by providing graphical display. The design assistance tool provides the user with an environment (editor) in which design tasks such as selection of a slave device model, connection order and connection ports (topology design), and node addresses and various types of parameters to be assigned to the slave devices can be easily performed by using a GUI indicated on a display of the management device 600. Hereinafter, a group of the functions implemented by the design assistance tool of the management device 600 will be referred to as a design assistance device.

The information of the network configuration created by the user by using the design assistance device is referenced when assembling an actual machine and, additionally, utilized in the design and developments of a program to be executed in the master device 200 and the maintenance after operations of the actual machine. Therefore, if the network configuration encounters a change in an assembly process of the actual machine, the change should preferably be reflected in the design information in the design assistance device as quickly as possible. Accordingly, the design assistance device of the present embodiment has a network configuration cross-check function configured to assist tasks to compare the designed network configuration and the actual machine's network configuration and modify the designed network configuration against the actual machine.

Figure 1:
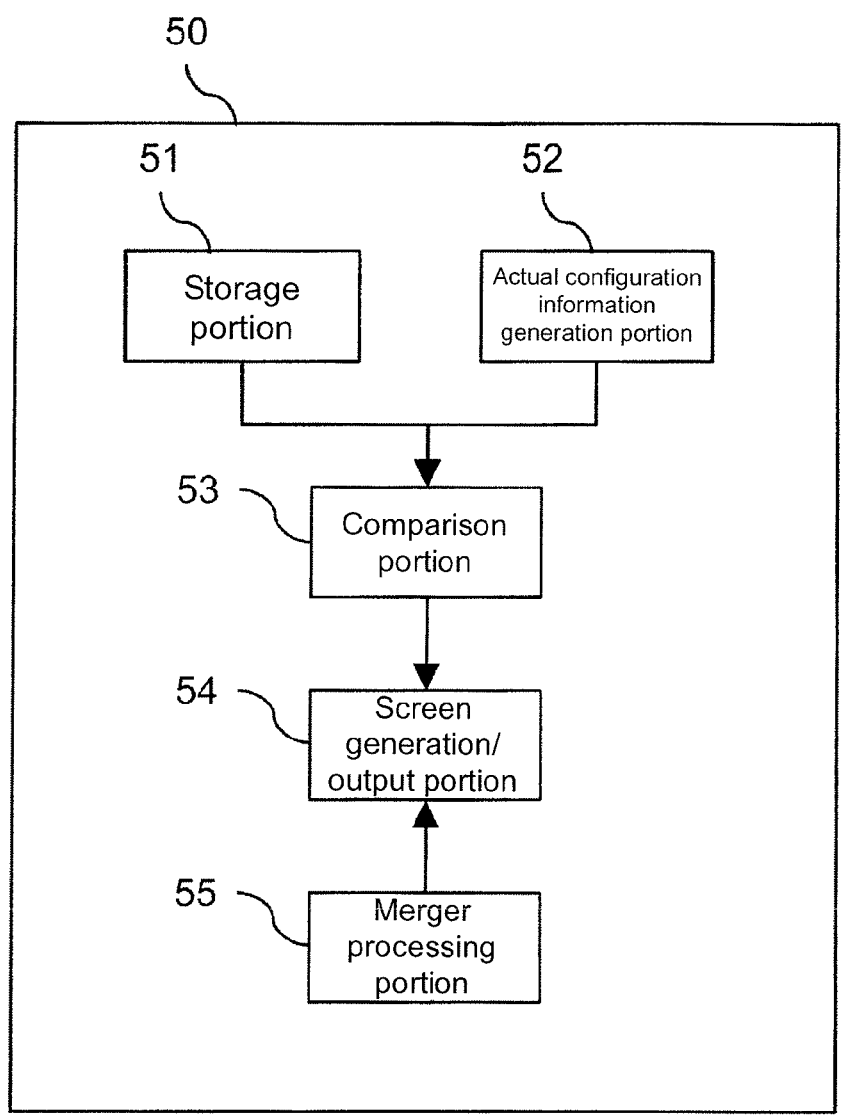
FIG. 1 is a block diagram showing a functional configuration related to a network configuration cross-check function in a design assistance device.

FIG. 1 is a block diagram showing the functional configuration of portions related to the network configuration cross-check function in the design assistance device of the present embodiment. A design assistance device 50 has a storage portion 51, an actual configuration information generation portion 52, a comparison portion 53, a screen generation/output portion 54, and a merger processing portion 55. The design assistance device 50 include, as hardware, a general-purpose computer including a Central Processing Unit (CPU), a main storage device (memory), an auxiliary storage device (hardware), a display device, an input device (keyboard, mouse, etc.), and a communication IF. The functions 51 to 55 described above are realized when a program stored in the auxiliary storage device is loaded to the main storage device and executed by the CPU. Explanation of the functions other than the network configuration cross-check function will be omitted in the present specification.

The storage portion 51 is a function (design information storage section) that stores the information (referred to as "design information") of a network configuration in accordance with a design created by the design assistance device 50. The design information is data that describes profile information of the slave devices of a network system, slave connection information, and address information. In this case, the profile information is used to identify the model of the slave devices and contains, for example, a product code, a vendor ID, a revision number, etc. of the slave devices. The slave connection information is used to understand a connection configuration (topology) of the slave devices and contains, for example, information that identifies slave device connection-destination devices and ports. The address information is used to indicate the value of a node address assigned to the slave device. Besides those design information pieces, a slave information file in which unique information of the slave devices is described for each model is stored in the storage portion 51. The slave information file contains, for example, the product code, the vendor ID, the revision number, the number of ports, the type of ports, etc.

FIG. 3(A) schematically shows an example of the design information stored in the storage portion 51. In this example, the information of six slave devices is described in order of position addresses. The first slave device is identified by "product code: a1, vendor ID: A, revision number: 002 (a-1-A-002)" and connected to an "OUT" port of a device "MASTER" (master device) and has its node address set to "1". The second slave device is identified by "a3-A-000" and connected to an "internal" port of the device "a1-A-002" and has its node address set to "2". As for the third slave device and the subsequent, the information that identifies their respective slave device models, connection destinations, and node addresses is described. Although the user himself can directly create and edit design information, in the design assistance device 50 of the present embodiment, if a network configuration is created by the user by using a GUI of the editor, such design information as shown in FIG. 3(A) is exported automatically.

The actual configuration information generation portion 52 is a function (actual configuration information generation section) that generates information (referred to as "actual configuration information") of the network configuration of an actual machine. The actual configuration information is different from the design information created by the user as described above in that it is generated on the basis of information collected by the master device 200 from the slave devices 300 in the actual network system 100. Slave information collection processing by the master device 200 will be described later. FIG. 3(B) schematically shows an example of actual configuration information generated by the actual configuration information generation portion 52. The types of the information pieces contained in the actual configuration information are essentially the same as those contained in the design information.

The comparison portion 53 is a function (comparison section) that compares the design information and the actual configuration information and extract their commonalities and differences. The screen generation/output portion 54 is a function (output section) that generates, based on the results of comparison by the comparison portion 53, a comparison screen indicating the designed network configuration and the actual machine's network configuration along with their commonalities and differences and outputs the comparison screen to the display device. Further, the merger processing portion 55 is a function (selection section, modification section) that enables modifying the network configuration on the comparison screen. Operations of the comparison portion 53, the screen generation/output portion 54, and the merger processing portion 55 will be described later.

(Operations of Network Configuration Cross-Check Function)

Next, a description will be given in detail of operations of the network configuration cross-check function with reference to FIGS. 4 to 9.

(1) Collection of Slave Information

FIG. 4 is a flowchart showing a flow of slave information collection processing (network scan processing).

First, the master device confirms the number of the slave devices that exist in a network (S100). For example, data (initial value=0) sent from the master device is counted up in each of the slave devices to then return the results to the master device, enabling acquiring a total number of the slave devices. The processing is performed in the position address mode. In the example in FIG. 2, the slave count is "6".

Next, the master device reads profile information and slave connection information from each of the slave devices (step S101). Further, the master device reads an alias set in each of the slave devices from the slave devices (step S102). The processing in step S101 and that in step S102 are also performed in the position address mode.

The data pieces collected by performing the processing pieces in steps S101 and S102 on all of the slave devices are sent to the design assistance device 50 (management device). Then, based on those data pieces, the actual configuration information generation/output portion 52 in the design assistance device 50 creates actual configuration information that indicates a network configuration of this network system (step S103). By those processing pieces, such actual configuration information as shown in FIG. 3(B) can be obtained. Although the present embodiment has created the actual configuration information at the actual configuration information generation portion 52 in the design assistance device 50, there is no problem if the actual configuration information is created in the master device only to send the resultant data from the master device to the actual configuration information generation portion 52.

(2) Comparison of Network Configurations

Figure 5:
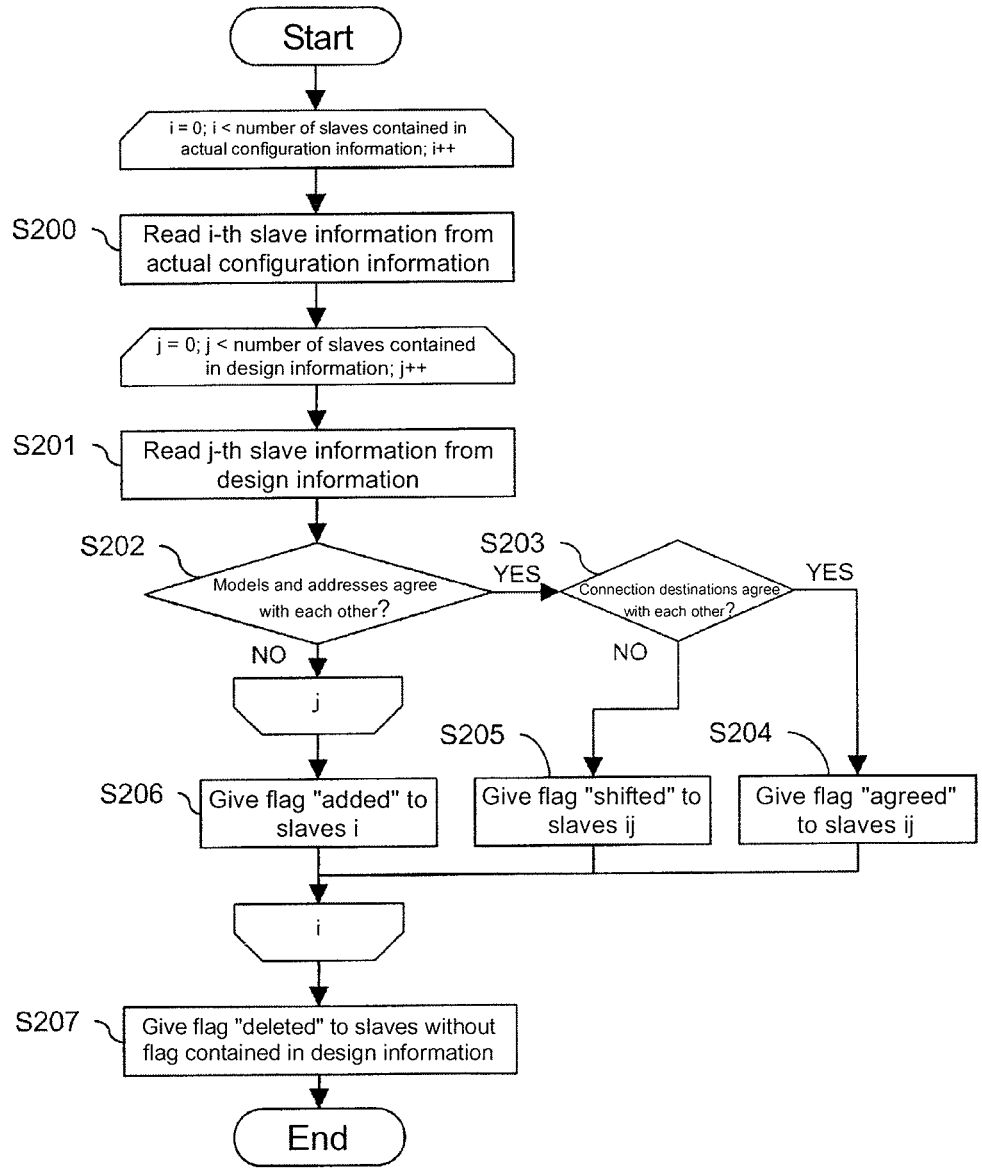
FIG. 5 is a flowchart showing a flow of network configuration comparison processing.

FIG. 5 is a flowchart showing a flow of network configuration comparison processing performed by the comparison portion 53 in the design assistance device 50. In the processing, as results of the comparison, flags "AGREED", "SHIFTED", "ADDED", and "DELETED" are given to the respective slave devices. The flags have the following meanings.

"AGREED" . . . Models, addresses, and connection destinations all agree with each other.

"SHIFTED" . . . The models and addresses agree with each other but only the connection destinations disagree with each other.

"ADDED" . . . Not contained in the design information but contained in the actual configuration information.

"DELETED" . . . Contained in the design information but not contained in the actual configuration information.

The comparison portion 53 reads information of the i-th ($0 \leq i <$ the number of the slaves contained in the actual configuration information) slave device (hereinafter simply referred to as "slave i") from the actual configuration information (step S200). The comparison portion 53 sequentially reads information of the j-th ($0 \leq j <$ the number of the slaves contained in the design information) slave device (hereinafter simply referred to as "slave j") from the design configuration information (step S201) and checks whether the models and the addresses of the slaves i and j agree with each other, respectively (step S202) and then checks whether their respective connection-destination devices and ports agree with each other (step S203).

If a combination of the slaves i and j that agree with each other in all of model, address, and connection destination is found, the comparison portion 53 gives the flag "AGREED" to those slaves i and j (step S204). If a combination of the slaves i and j that agree with each other in model and address but not only in connection destination is found, the comparison portion 53 gives the flag "SHIFTED" to those slaves i and j (step S205). If no slave that agrees with the slave i in model and address is found in the design information, the comparison portion 53 gives the flag "DELETED" to the slave i (step S206).

After having performed the processing in steps S200 to S206 on all of the slave devices contained in the actual configuration information, the comparison portion 53 checks whether there still exists any slave device to which no flag is given and, if any, gives the flag "DELETED" to the slave device (step S207).

In such a manner, the present embodiment decides whether the models of the slave devices agree with each other in step S202. Thus, it is possible to more strictly recognize agreement/disagreement in network configuration, assuring reliabilities of the design information (coincidence with the actual machine).

Further, in the present embodiment, if only the addresses are difference, it is also decided that the properties are different ("ADDED" or "DELETED"). This is because, if an address different from that in accordance with a design is assigned to the slave device in an actual machine, a problem occurs in message communication in which a communication-partner node is identified, so that a trouble may occur in monitoring, management, or control of the slave devices. Such a problem due to wrong addresses can be prevented beforehand by checking the node addresses also to enhance the reliabilities of the design information (coincidence with the actual machine) beforehand.

Further, in the present embodiment, it is also decided in step S203 whether the connection destination (device and port) is different. This is because, if only the connection-destination port is changed despite that the connection-destination device may be the same in an industrial network system, the arrival destination or arrival order of data pieces sent from the master device changes, so that a trouble may occur in control or synchronization of the slave devices in some cases. In this respect, the situation is different from the case of a typical computer network, in which no matter to which port of the hub device the node is connected, the topology is not changed and no special trouble occurs.

(3) Display of Comparison Screen

FIG. 6 is one example of a comparison screen generated and output by the screen generation/output portion 54 in the design assistance device 50. On the comparison screen, a display portion 10 of a network configuration in accordance with a design, a display portion 20 of an actual network configuration, and a display portion 30 of comparison results are provided in this order from the left.

As shown in FIG. 6, in the display portion 10, a topology tree of GUI is displayed, the topology tree having a network configuration in accordance with a design generated on the basis of design information and a slave information file. In the topology tree, devices such as a master device 11 and slave devices 12a to 12f are displayed with icon components, the icon components being connected with lines 13 representing a cable or an internal bus. In this case, the lines 13 may have different colors or thicknesses depending on whether they represent the cable or the internal bus used for connection. Further, in the case of a slave device 12b, which is a hub device, branching ports X1, X2 also may well be represented by an icon component.

In the topology tree, the icon components are displayed in a manner such that each device may be displayed in each row, that is, a plurality of devices may not overlap with each other horizontally. Each row displays the value of a node address assigned to the slave device and profile information of the slave device in texts. Further, in the topology tree, to enable intuitively understanding a topology hierarchy, the icon components for the devices in a series relationship in accordance with daisy chain connection are disposed in the same column and, if the topology branches off through the internal bus or the branching port, the icon components are disposed in the different columns. By thus inventively disposing the rows and the columns, the user can easily know the parent-child relationship of the slave devices in the network system, namely the connection order.

Also in the display portion 20 of the actual machine's network configurations, like in the case of the display portion 10, a topology tree of GUI is displayed, the topology tree having an actual machine's network configuration (a master device 21, slave devices 22a to 22f). By thus displaying the two topology trees side by side, the user can graphically grasp commonalities and differences between the designed network configuration and the actual machine's network configuration. For example, in the example in FIG. 6, it is possible to recognize that the connection order is different between the position of the slave device 12c and that of the slave device 22e.

To further help the user in understanding, the results of comparison by the comparison portion 53 are also displayed in the display portion 30 on the comparison screen. When looking at the display portion 30, it is possible to easily grasp commonalities and differences (addition/deletion/shifting) between the designed network configuration and the actual machine's network configuration.

(4) Modification of Design Information

The merger processing portion 55 in the design assistance device 50 is a function that enables the user to modify the design information on the comparison screen. In the present embodiment, roughly three operation methods for modification are provided.

Figure 7:
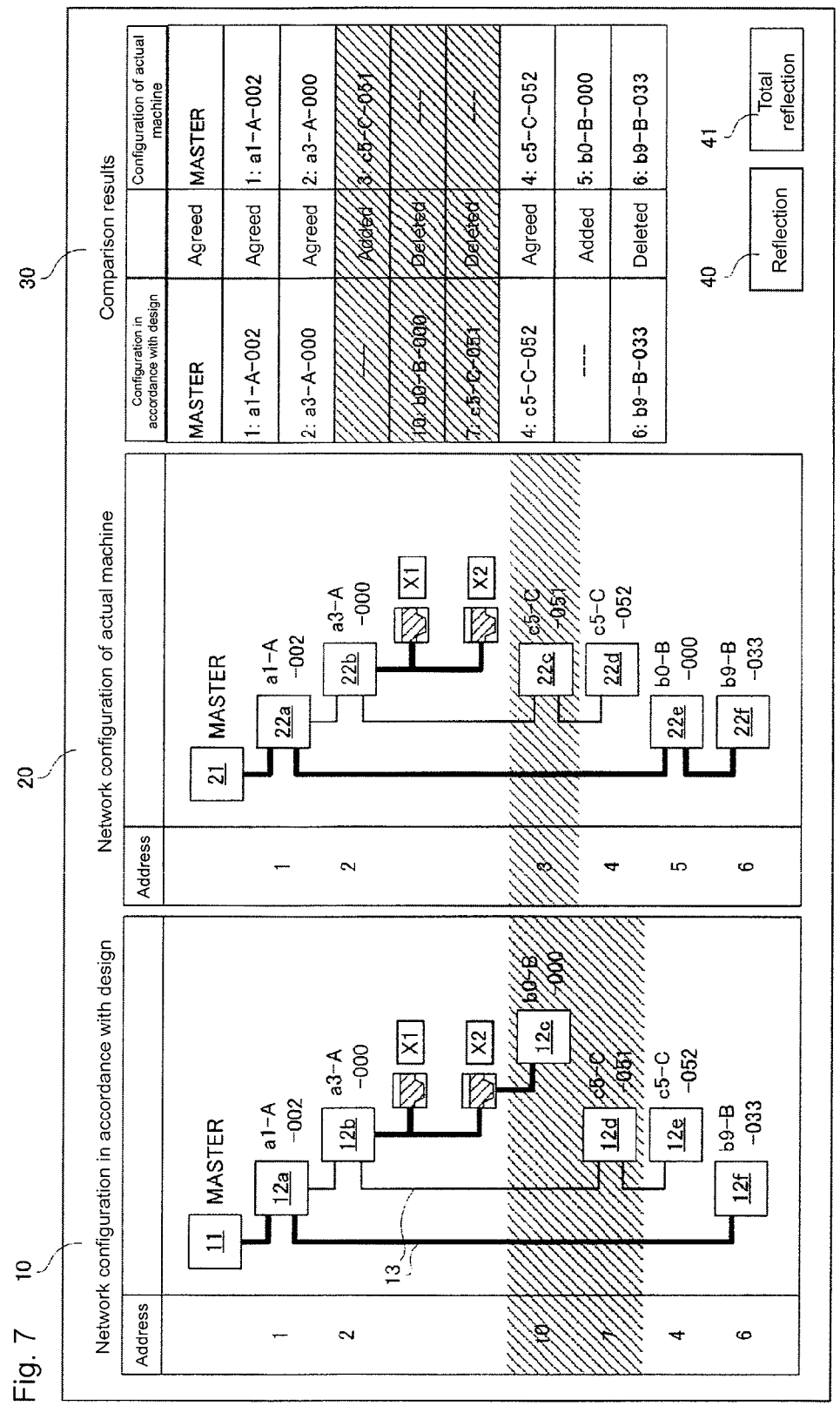
FIG. 7 is a table showing a state where portions desired to be modified are selected on the comparison screen.
Figure 8:
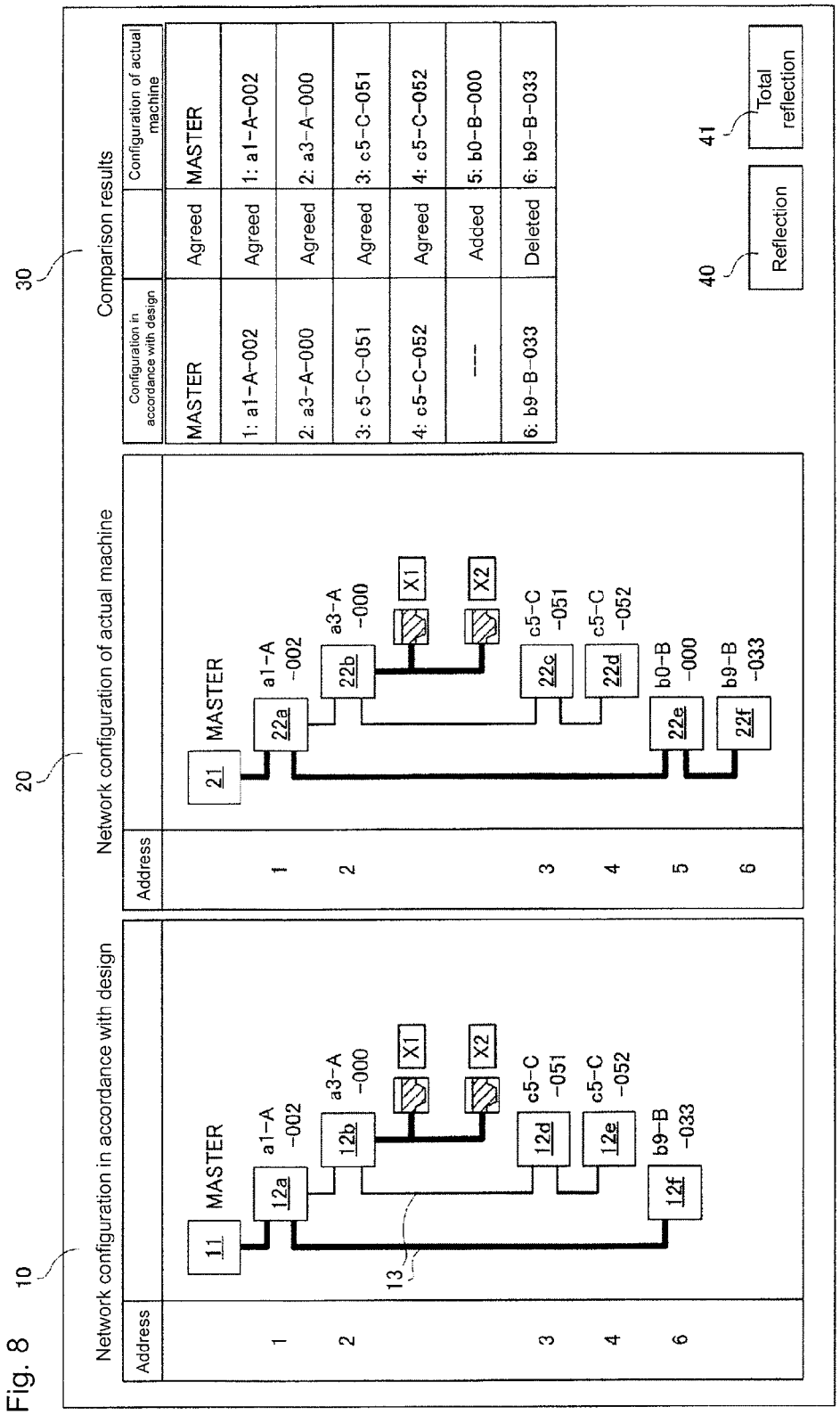
FIG. 8 is a table showing a state the selected portions in FIG. 7 are modified.

The first method is to select a portion desired to be modified and press a reflection button 40 in the display portion 30 of the comparison results or in a topology tree of the designed network configuration or the actual machine's network configuration. FIG. 7 shows a state where portions corresponding to the slave devices 12c, 12d, and 22c are selected. If the reflection button 40 is pressed in this state, the merger processing portion 55 modifies the design information in accordance with contents of those selected portions and, based on the modification, the comparison screen is updated as shown in FIG. 8. FIG. 8 shows that the slave device 12c is deleted and the slave device 12d has the same node address of "3" as that of the slave device 22c, in the designed network configuration.

Figure 9:
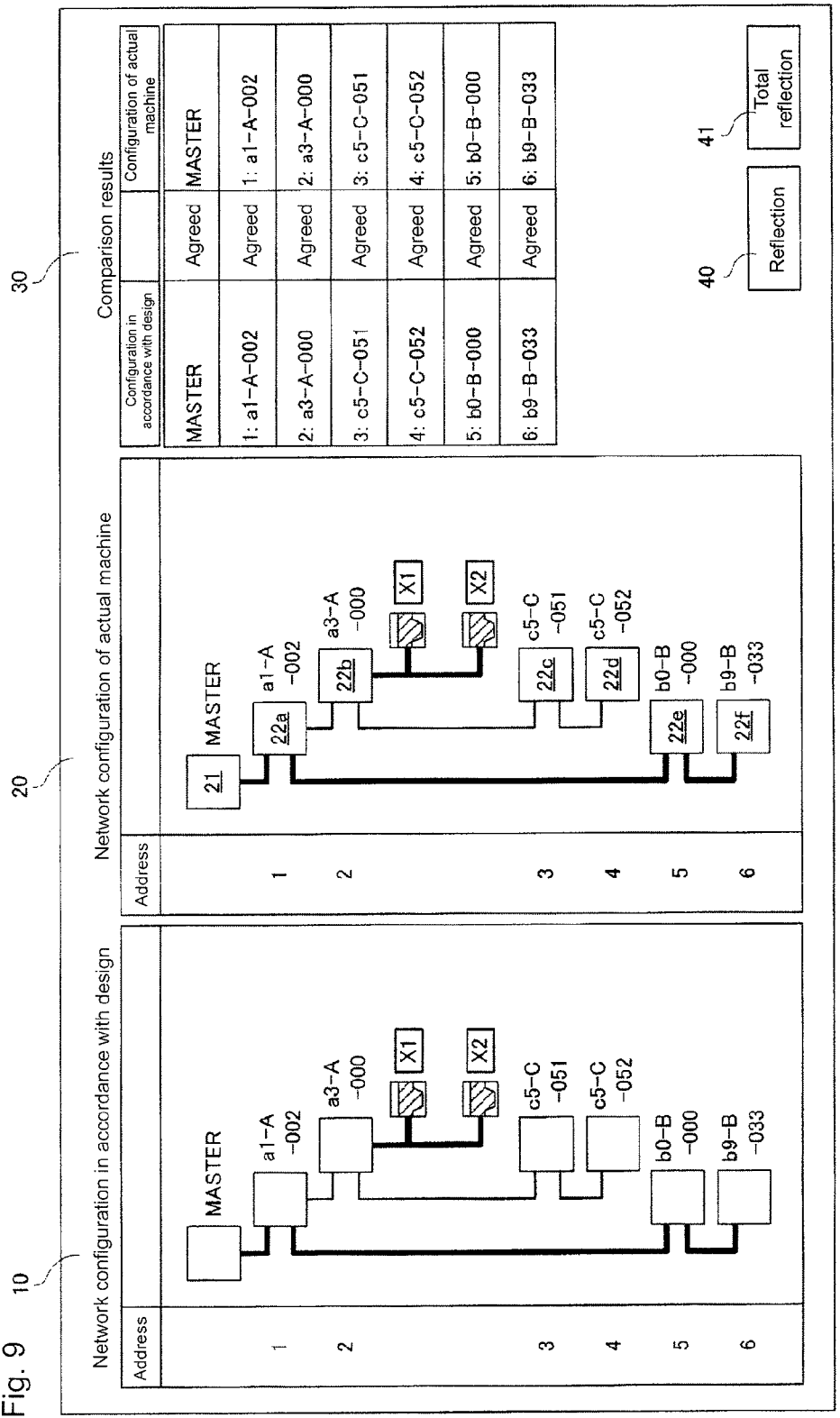
FIG. 9 is a table showing a state where a network configuration of an actual machine is totally reflected.

The second method is to press a total reflection button 41. If the total reflection button 41 is pressed, the merger processing portion 55 modifies the design information in a manner such that the design information may be completely the same as the actual machine's network configuration. FIG. 9 shows an example of the comparison screen after total reflection. FIG. 9 shows that if the topology tree is the same, the comparison results all "AGREED".

The third method is to modify the model or connection order of the slave devices and rewrite the node addresses by adding, deleting, and replacing (dragging and dropping) the icon components in a topology tree having a network configuration in accordance with a design. Of course, the contents displayed on the comparison screen are updated as the topology tree or the node address is modified. By this method, the user can easily modify the design information.

As described above, in the design assistance device (network configuration cross-check function) of the present embodiment, a network configuration in accordance with a design and an actual machine's network configuration are compared to each other automatically, presenting results of the comparison to the user as a comparison screen. On the comparison screen, commonalities and differences between the design network configuration and the actual machine's network configuration are easily shown graphically. Therefore, the user can simply grasp portions of the network configuration to be changed quickly and also easily decide how to modify the design information in accordance with the actual machine.

Further, only by simply selecting portions desired to be modified on the comparison screen, the modification contents are reflected in the design information, so that the user can simply modify the design information quickly. Moreover, it is also possible to modify only some of the portions or all of them collectively, so that the design information can be modified efficiently. Besides, the comparison screen is updated as the information is modified, so that the modification task can be performed while confirming commonalities and differences in network configuration on the comparison screen.

(Variant)

Although in the above embodiment, the commonalities and differences between the designed network configuration and the actual machine's network configuration have been evaluated in four states of "AGREED", "SHIFTED", "ADDED", and "DELETED", it is just one example. For example, they may be evaluated by "AGREED" and "DIFFERENT" or in three states of "AGREED", "ADDED", and "DELETED" without checking the commonalities and differences in connection destination. Of course, the commonalities and differences may be evaluated in more detail in states of "ADDRESS CHANGED" and "MODEL CHANGED".

Further, the comparison screen and modification method described in the above embodiment is just one example. For example, display of the comparison results is sufficient as long as its purpose is to display the commonalities and differences between the designed network configuration and the actual machine's network configuration. Conversely, display of the comparison results may be incorporated into the topology tree by, for example, displaying the different portions' icon components and backgrounds in different colors such that the commonalities and differences in a displayed topology tree can be understood at first sight.

As described above, the first aspect of the invention is a design assistance device of a network system including a master device and a plurality of slave devices, the design assistance device including: a design information storage section configured to store design information containing at least information of the slave devices and information of a topology in a network system in accordance with a design created by a user; an actual configuration information generation section configured to, based on information collected by the master device from the slave devices in an actual network system, generate actual configuration information containing at least the information of the slave devices and the information of the topology in the actual network system; a comparison section configured to compare the design information and the actual configuration information; and an output section configured to, based on results of comparison by the comparison section, generate a comparison screen indicating the respective configurations of the designed network system and the actual network system along with their commonalities and differences and outputting the comparison screen to a display device.

It is preferable that the design assistance device of the invention further includes a selection section configured to permit the user to select at least some of portions related to differences between the designed network system and the actual network system on the comparison screen; and a modification section configured to modify the design information in a manner such that the configuration of the portions selected by the selection section may be the same as that of the actual network. By the configuration, only by simply selecting portions desired to be modified on the comparison screen, the modification contents are reflected in the design information, so that the user can simply modify the design information quickly. In this case, the selection section should preferably enable the user to select a plurality of the slave devices in the configuration of the actual network system on the comparison screen. It is thus possible to collectively command modification all over the plurality of slave devices, efficiently performing design information modification tasks.

It is preferable that the output section updates the comparison screen in a manner such that commonalities and differences between the post-modification configuration of the designed network system and the actual network system may be indicated in accordance with modifications by the modification section. By the configuration, the modification task can be performed while confirming the commonalities and differences in network configuration on the comparison screen, to further improve operability and task efficiency.

It is preferable that the information of the slave device contains information to identify a model of the slave device and the comparison section decides whether the model of the slave device contained in the design information and that contained in the actual configuration information agree with each other. By thus checking also the slave device model, the commonalities and differences in network configuration can be evaluated more strictly, assuring the reliabilities of the design information (coincidence with the actual machine).

It is also preferable that the slave device information contains information to identify an address assigned to the slave device and the comparison section decides whether the address assigned to the slave device contained in the design information and that contained in the actual configuration information agree with each other. If the address assigned to the slave device in the actual machine is different from that at the time of design, a problem occurs in message communication in which a communication-partner node is identified such that a trouble may occur in monitoring, management, or control of the slave devices. Such a problem due to wrong addresses can be expected to be prevented beforehand by checking the address of the slave device also to enhance the reliabilities of the design information (coincidence with the actual machine) beforehand.

It is also preferable that the topology information contains information to identify connection-destination devices and ports of the slave device and the comparison section decided whether the slave device's connection-destination devices and ports contained in the design information and those contained in the actual configuration information agree with each other. In a typical computer network, no matter to which port of the hub device the node is connected, the topology is not changed and no special trouble occurs. In contrast, in an industrial network system, if only the connection-destination port is changed despite that connection-destination device may be the same, the arrival destination or arrival order of data pieces sent from the master device changes, so that a trouble may occur in control or synchronization of the slave devices in some cases. Such a problem due to a wrong destination connection can be expected to be prevented beforehand by checking the connection-destination devices and ports to enhance the reliabilities of the design information (coincidence with the actual machine) beforehand as in the case of the invention.

The invention can be identified as a design assistance device including at least some of those sections and also can be identified as a program to cause a computer to function as the design assistance device or a computer-readable recording medium in which the program is recorded. Moreover, the present invention can be identified also as a design assistance method including at least some of processing pieces performed by those sections. Those processing pieces and sections can be combined arbitrarily as long as no technical conflicts occur.

For example, the second aspect of the invention is a program for assisting design of a network system including a master device and a plurality of slave devices and, if executed by a computer, causing the computer to function as: a design information storage section configured to store design information containing at least information of the slave devices and information of a topology in a network system in accordance with a design created by a user; an actual configuration information generation section configured to, based on information collected by the master device from the slave devices in an actual network system, generate actual configuration information containing at least the information of the slave devices and the information of the topology in the actual network system; a comparison section configured to compare the design information and the actual configuration information; and an output section configured to, based on results of comparison by the comparison section, generate a comparison screen indicating the respective configurations of the designed network system and the actual network system along with their commonalities and differences and outputting the comparison screen to a display device.

Further, the third aspect of the invention is a design assistance method for assisting design of a network system including a master device and a plurality of slave devices and causing the computer to perform the steps of: storing design information containing at least information of the slave devices and information of a topology in a network system in accordance with a design created by a user; based on information collected by the master device from the slave devices in an actual network system, generating actual configuration information containing at least the information of the slave devices and the information of the topology in the actual network system; comparing the design information and the actual configuration information; and, based on results of comparison by the comparison section, generating a comparison screen indicating the respective configurations of the designed network system and the actual network system along with their commonalities and differences and outputting the comparison screen to a display device.

DESCRIPTION OF SYMBOLS

50 Design assistance device
51 Storage portion
52 Actual configuration information generation portion
53 Comparison portion
54 Screen generation/output portion
55 Merger processing portion
100 Industrial network system
200 Master device
300 Slave device
400 Cable
500 I/O unit
600 Management device
700 Hub device
10 Display portion in network configuration in accordance with a design
11 Icon component of master device
12a~12f Icon component of slave device
13 Line
20 Display portion in network configuration of actual machine
21 Icon component of master device
22a~22f Icon component of slave device
30 Display portion of comparison results
40 Reflection button
41 Total reflection button

The invention claimed is:

1. A design assistance device of a network system including a master device and a plurality of slave devices, the design assistance device comprising:
a storage that stores instructions, and design information, the design information containing at least information of the slave devices and information of a topology in a designed network system created by a user; and
a processor that, when executing the instructions stored in the storage, performs operations comprising:

generating, based on information collected by the master device from the slave devices in an actual network system, actual configuration information containing at least the information of the slave devices and the information of the topology in the actual network system;

comparing the design information and the actual configuration information, to identify a commonality and a difference between the design information and the actual configuration information;

generating, based on a result of the comparison, a comparison screen, indicating a configuration of the designed network system, a configuration of the actual network system, and the commonality and the difference between the design information and the actual configuration information;

displaying the generated comparison screen on a display;

permitting the user to select a portion on the comparison screen, the selected portion being related to the difference between the design information and the actual configuration information; and modifying the design information such that the configuration of the selected portion in the design information coincides with the configuration of the selected portion of the actual configuration information, wherein the commonality and the difference between the design information and the actual configuration includes at least first, second, third and fourth statuses, the first status indicates that models, addresses and connection destinations of a slave device are in agreement between the design information and the actual configuration information, the second status indicates that the models and addresses are in agreement, but the connection destinations are not in agreement, the third status indicates that a slave device is not in the design information but is included in the actual configuration information, and the fourth status indicates that a slave device is included in the design information but is not included in the actual configuration information.

2. The design assistance device according to claim 1, wherein the processor, when executing the instructions stored in the storage, further performs operations comprising:

updating the comparison screen such that the commonality and the difference between the modified design information and the actual configuration information is indicated.

3. The design assistance device according to claim 1, wherein the information of the slave device contains information to identify a model of the slave device; and the comparing comprises determining whether the model of the slave device contained in the design information agrees with the model of the slave device contained in the actual configuration information.

4. The design assistance device according to claim 1, wherein:

the information of the slave device contains the information to identify an address assigned to the slave device; and the comparing comprises determining whether the address assigned to the slave device contained in the design information agrees with the address assigned to the slave device contained in the actual configuration information.

5. The design assistance device according to claim 1, wherein:

the topology information contains information to identify connection-destination devices and ports of the slave device; and the comparing comprises determining whether the connection-destination devices and ports of the slave device contained in the design information agree with the connection-destination device and ports of the slave device contained in the actual configuration information.

6. A non-transitory computer-readable recording medium that stores a program for assisting design of a network system including a master device and a plurality of slave devices, the program causing a computer to perform operations comprising:

storing design information, containing at least information of the slave devices and information of a topology in a designed network system created by a user;

generating, based on information collected by the master device from the slave devices in an actual network system, actual configuration information containing at least the information of the slave devices and the information of the topology in the actual network system;

comparing the design information and the actual configuration information, to identify a commonality and a difference between the design information and the actual configuration information; and generating, based on a result of the comparison, a comparison screen, indicating a configuration of the designed network system, a configuration of the actual network system, and the commonality and the difference between the design information and the actual configuration information;

displaying the generated comparison screen on a display;

permitting the user to select a portion on the comparison screen, the selected portion being related to the difference between the design information and the actual configuration information; and modifying the design information such that the configuration of the selected portion in the design information coincides with the configuration of the selected portion of the actual configuration information, wherein the commonality and the difference between the design information and the actual configuration includes at least first, second, third and fourth statuses, the first status indicates that models, addresses and connection destinations of a slave device are in agreement between the design information and the actual configuration information, the second status indicates that the models and addresses are in agreement, but the connection destinations are not in agreement, the third status indicates that a slave device is not in the design information but is included in the actual configuration information, and the fourth status indicates that a slave device is included in the design information but is not included in the actual configuration information.

7. A computer-implemented design assistance method for assisting design of a network system including a master device and a plurality of slave devices, the computer-implemented design assistance method comprising:

storing design information containing at least information of the slave devices and information of a topology in a designed network system created by a user;

generating, based on information collected by the master device from the slave devices in an actual network system, actual configuration information containing at least the information of the slave devices and the information of the topology in the actual network system;

comparing the design information and the actual configuration information, to identify a commonality and a difference between the design information and the actual configuration information;

generating, based on a result of the comparison, a comparison screen, indicating a configuration of the designed network system, a configuration of the actual network system, and the commonality and the difference between the design information and the actual configuration information;

displaying the generated comparison screen on a display;

permitting the user to select a portion on the comparison screen, the selected portion being related to the difference between the design information and the actual configuration information; and modifying the design information such that the configuration of the selected portion in the design information coincides with the configuration of the selected portion of the actual configuration information, wherein the commonality and the difference between the design information and the actual configuration includes at least first, second, third and fourth statuses, the first status indicates that models, addresses and connection destinations of a slave device are in agreement between the design information and the actual configuration information, the second status indicates that the models and addresses are in agreement, but the connection destinations are not in agreement, the third status indicates that a slave device is not in the design information but is included in the actual configuration information, and the fourth status indicates that a slave device is included in the design information but is not included in the actual configuration information.

8. The design assistance device according to claim 1, wherein the comparison screen includes a table including a list of slave devices included in the design information, a list of slave devices included in the actual configuration information, and the four statuses associating the slave devices included in the design information and the slave devices included in the actual configuration information.

* * * * *

UNITED STATES PATENT AND TRADEMARK OFFICE
CERTIFICATE OF CORRECTION

PATENT NO.        : 9,596,124 B2
APPLICATION NO.   : 14/005324
DATED             : March 14, 2017
INVENTOR(S)       : H. Sasaka et al.

It is certified that error appears in the above-identified patent and that said Letters Patent is hereby corrected as shown below:

On the Title Page

Title of the Invention (54), of the printed patent, please insert -- DESIGN -- before ASSISTANCE.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*